(12) United States Patent
Mausy

(10) Patent No.: US 7,740,178 B2
(45) Date of Patent: Jun. 22, 2010

(54) SET OF CONTACTLESS SMART TICKETS

(75) Inventor: Guy Mausy, Colomars (FR)

(73) Assignee: ASK S.A., Valbonne-Sophia Antipolis (FR)

( * ) Notice: Subject to any disclaimer, the term of this patent is extended or adjusted under 35 U.S.C. 154(b) by 115 days.

(21) Appl. No.: 11/769,103

(22) Filed: Jun. 27, 2007

(65) Prior Publication Data

US 2008/0000984 A1    Jan. 3, 2008

Related U.S. Application Data

(60) Provisional application No. 60/904,381, filed on Mar. 2, 2007.

(30) Foreign Application Priority Data

Jun. 27, 2006  (FR) .................................. 06 05753

(51) Int. Cl.
*G06K 21/00* (2006.01)
*G06K 19/00* (2006.01)
*G06K 7/06* (2006.01)
*B26F 3/02* (2006.01)

(52) U.S. Cl. ....................... 235/489; 235/487; 235/442; 225/32

(58) Field of Classification Search .................. 235/487, 235/489, 442
See application file for complete search history.

(56) References Cited

U.S. PATENT DOCUMENTS

| 1,983,463 | A |   | 12/1934 | Kingsbury | ..................... 281/5 |
| 2,620,205 | A | * | 12/1952 | Vogt | ............................... 281/5 |
| 5,453,311 | A |   | 9/1995  | Svensson | ..................... 428/43 |
| 7,419,149 | B2 | * | 9/2008 | Oota et al. | ............... 270/52.17 |

FOREIGN PATENT DOCUMENTS

| GB | 1401977 | * | 8/1975 |
| SE | 505639 |   | 9/1997 |
| WO | WO9709694 | * | 3/1997 |

* cited by examiner

*Primary Examiner*—Michael G Lee
*Assistant Examiner*—Laura Gudorf
(74) *Attorney, Agent, or Firm*—James C. Lydon

(57) ABSTRACT

Set of tickets in the form of a continuous strip (35, 85) of multilayer detachable tickets featuring, between two adjacent tickets (30 and 31, 80 and 81), cross precuts (32, 82) alternating with ticket linking bridges (33, 83), the transversal precuts being used to guide the separation of adjacent tickets when a pulling force is applied on one of the tickets. The cross precuts (32, 82) feature at their end longitudinal precuts (34, 84) that are perpendicular or oblique to cross precuts so that the linking bridges (33, 83) between two adjacent tickets play the role of hinges when the adjacent tickets are folded or are not in the same plane, thus preventing the outer layer from being subjected to more stresses than the inner layer.

9 Claims, 5 Drawing Sheets

SET OF CONTACTLESS SMART TICKETS

This application claims benefit of U.S. provisional application No. 60/904,381, filed Mar. 2, 2007.

TECHNICAL FIELD

This invention concerns tickets attached to one another and designed to be inserted into an automatic dispensing machine and specifically concerns sets of contactless smart tickets detachable from one another and the associated device to manufacture such tickets.

PRIOR ART

Paper tickets are widely used in many public-related areas such as access to parking or other reserved areas, as well as transport documents. Paper tickets known as "contactless tickets" also include a chip and an antenna connected together in the thickness of the ticket. When leaving the factory after being manufactured, paper tickets generally come in three forms of packaging. There exist single tickets delivered in boxes, tickets in rolls with or without precuts, and fanfold tickets with precuts.

Automatic dispensing machines are adapted to each type of packaging. In the special case of dispensing fanfold tickets, the precuts of tickets are used for separating tickets by tension. With reference to FIG. 1, the tickets 10 are in the form of a strip 11, each ticket presenting precuts 12 separated by linking bridges 13 at its end common with the next ticket, the bridges and the precuts being aligned along a line dividing two adjacent tickets along which the rupture by tension will occur. The pulling force required to separate the tickets must be constant between two adjacent tickets of the strip of tickets. If the strip breaks too easily, a rupture is possible before the ticket comes out of the machine. If the strip is too difficult to break, the machine may be unable to tear off a ticket. If the breaking force in a strip varies too much, both the previous cases can occur leading to a serious malfunction of the dispenser.

Obtaining a constant breaking force is rather easy with single-layer tickets. But current contactless tickets have two or three layers of paper glued together. These layers can be of different resistance and the fanfolds are alternating. In a diagrammatic representation according to FIG. 2, the tickets are stored as fanfold tickets 21, each outer layer of tickets on either side of a fold of the fanfold strip located alternately outside or inside the fold. In this manner, the outer layer 25 of the ticket 22 is more stressed and can sometimes tear along the line dividing two tickets as can be seen in the cross-section of FIG. 2, while the inner layer 26 of the ticket 22 is subjected to very little mechanical stress and is therefore less stressed than the outer layer. Similarly, the precuts located in the right side of the fanfold strip are not subjected to any stretching stress.

All these configurations within the same strip affect the precuts differently with the result that some layers of paper are more stretched than others. In this manner, the pulling force required to separate any two tickets of the strip is different depending on the tickets.

DISCLOSURE OF THE INVENTION

This is why the purpose of the invention is to provide tickets in the form of a strip of tickets attached to each other and detachable by means of an almost constant pulling force.

Another purpose of the invention is to provide a method for manufacturing tickets according to the first purpose of the invention.

The purpose of the invention concerns a set of tickets in the form of a continuous strip of multilayer detachable tickets featuring cross precuts that are perpendicular to the strip between two adjacent tickets alternating with ticket linking bridges, the cross precuts being used to guide the separation of adjacent tickets when a pulling force is applied on one of the tickets. The cross precuts feature at their end longitudinal precuts that are perpendicular or oblique to cross precuts so that the linking bridges between two adjacent tickets play the role of hinges when adjacent tickets are folded or are not in the same plane, thus preventing the outer layer from being subjected to more stresses than the inner layer.

The purposes, objects and characteristics of the invention will become more apparent from the following description when taken in conjunction with the accompanying drawings in which:

DETAILED DESCRIPTION OF THE INVENTION

Figure 3:
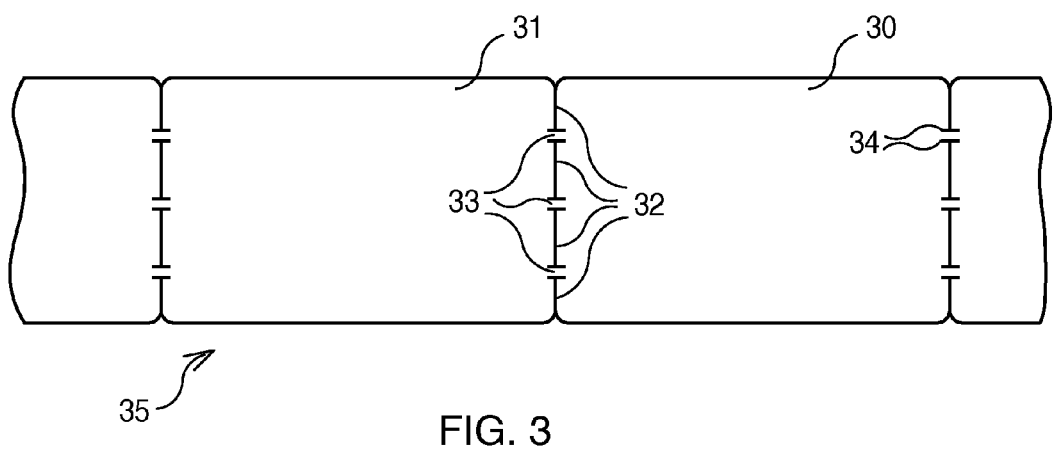
FIG. 3 represents a top view of a set of tickets according to the invention.

According to FIG. 3, multilayer tickets 30 in the form of rolls or fanfold strip are attached to each other by their cross edge to form a strip 35 of detachable tickets. Tickets 30 present or contain information that enable them to be used as a transport receipt or voucher. They are generally made of at least two layers of paper closely glued to each other. The layers are made of paper or a similar material such as synthetic paper. Each ticket 30 has, at its end common with the next ticket 31, cross precuts 32 and longitudinal precuts 34 located at the ends of cross precuts. Precuts are separated by linking bridges 33, the bridges and the cross precuts 32 being aligned along a line dividing two adjacent tickets along which the rupture by tension will occur. Cross precuts 32 are perpendicular to the strip of tickets 35 while longitudinal precuts 34 are perpendicular to the cross precuts. The longitudinal precuts 34 extend the linking bridges 33 towards the inside of the ticket 30. The linking bridges are thus clearly defined and play the role of hinges during folding of the tickets in a fanfold manner, as can be seen in detail in FIG. 4. The linking bridges thus bounded by two longitudinal precuts 34 which are parallel to each other have a rectangular shape and preferably a length between 0.9 mm and 2.5 mm and are separated by a distance between 1.1 mm and 2 mm.

Figure 4:
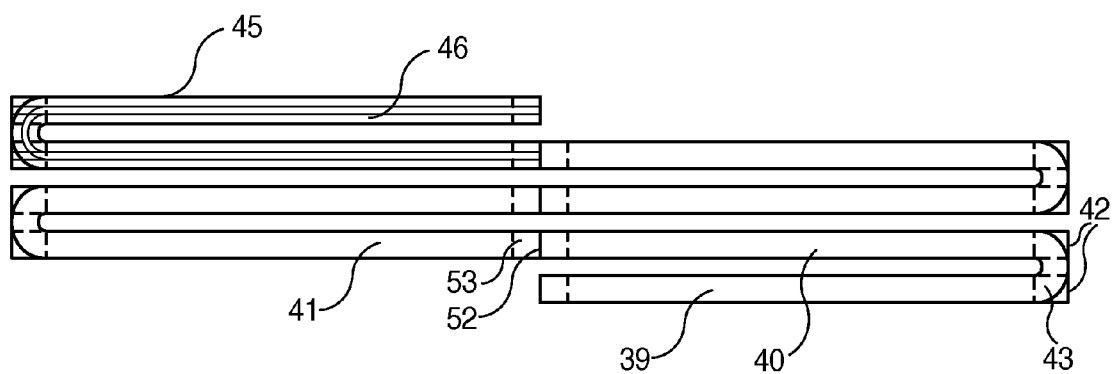
FIG. 4 represents a cross sectional view of the set of tickets of FIG. 3 stored in the form of a fanfold strip.

As diagrammatically shown in FIG. 4, the tickets stored in the form of a fanfold strip are shown in cross section. Two adjacent tickets 39 and 40 located on either side of a fold are thus held together by linking bridges 43 that have a radius of curvature designed so that no tearing is caused by the various layers of the tickets. The parts of the tickets along the precuts 42 are not pulled out so that the layer 45 of the ticket located outside the fold is not subjected to greater stretching stress than layer 46 of the ticket located inside. Two tickets 40 and 41 located in a straight part of the fanfold strip are held together by linking bridges 53 alternating with precuts 52. Similarly, when the tickets are stored in a roll, the linking bridges between two adjacent tickets acting as hinges reduce the stresses on the line of intersection between two tickets caused by the stiffness of tickets. The multilayer tickets set forth in the invention contain at least two layers whose thickness is equal to about 170 μm.

Figure 5:
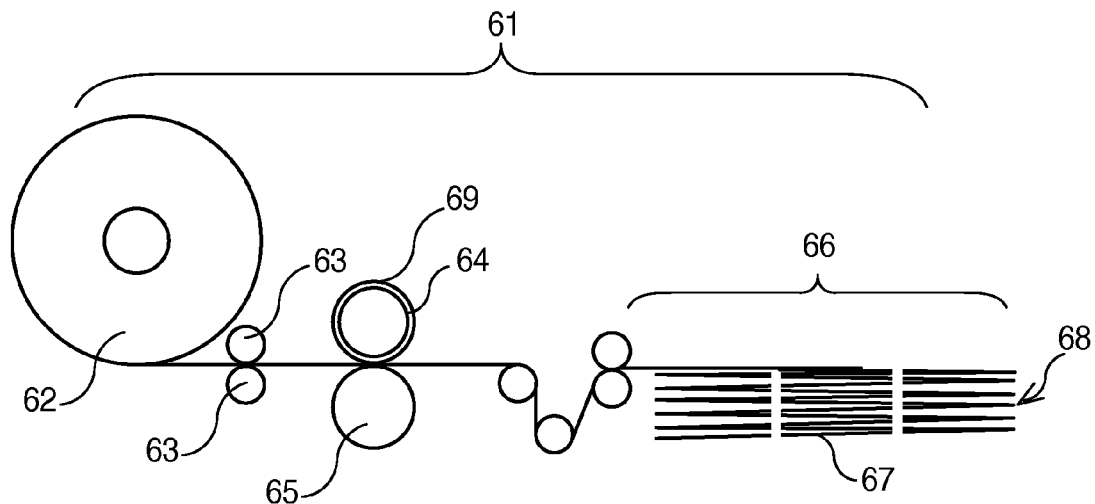
FIG. 5 represents the finishing machine for tickets of the set of tickets shown in FIG. 3.

According to FIG. 5, the finishing machine 61 for tickets consists of guide and tension rollers 63 between which the strip of tickets coming from a roll 62 is directed, a cutout cylinder 64 on which is wound the cutting tool 69, a pressure roll 65 and an accordion folding device 66 not shown. The tickets 67 are arranged in the form of a fanfold strip 68 for easy packaging and transportation to the dispensing locations.

Figure 6:
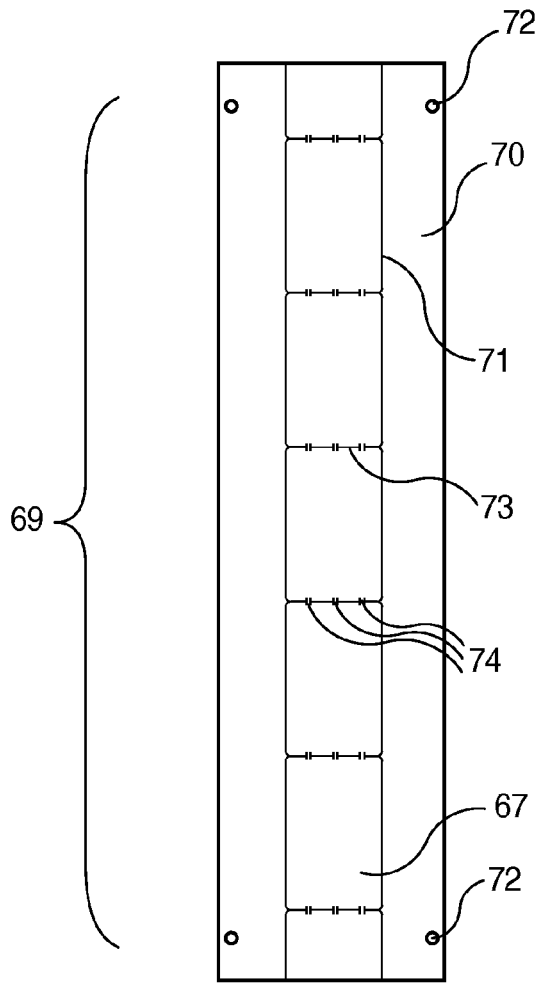
FIG. 6 represents a detailed view of the cutting tool of the finishing machine shown in the previous figure.

According to FIG. 6, the cutting tool 69 consists of a steel strip 70 on which blades 71 and 73 are welded. Centering holes 72 are used for the proper positioning of the cutting tool 69 on the mandrel 64. The blades 71 cut out the longitudinal edges of tickets 67. The blades 73 cut out the cross edges of tickets to form cross precuts used for separating tickets by tension. Several breaks 74 in the cross blades 73 form linking bridges between the tickets that are used to maintain the links between two adjacent tickets.

Figure 7:
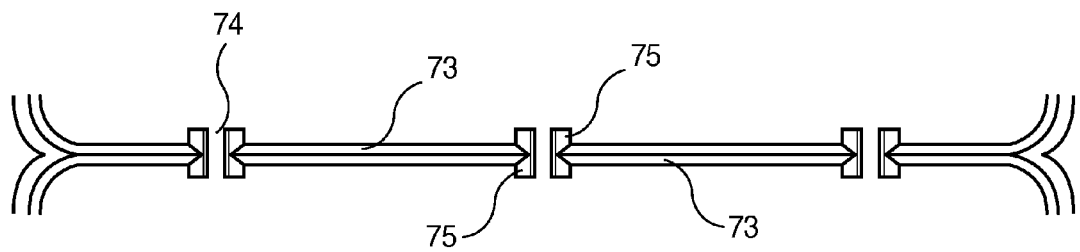
FIG. 7 represents a top view of the sharp part of the cutting tool.

According to FIG. 7, the breaks 74 in the cross blades 73 are completed by sharp segments 75 that enable longitudinal precuts 34 of small length to be made in the tickets. The cross blades have a length between 0.9 mm and 2.5 mm and separated by a distance between 1.1 mm and 2 mm. The sharp segments 75 are located at the ends of the cross blades 73 and are parallel to each other.

Figure 8:
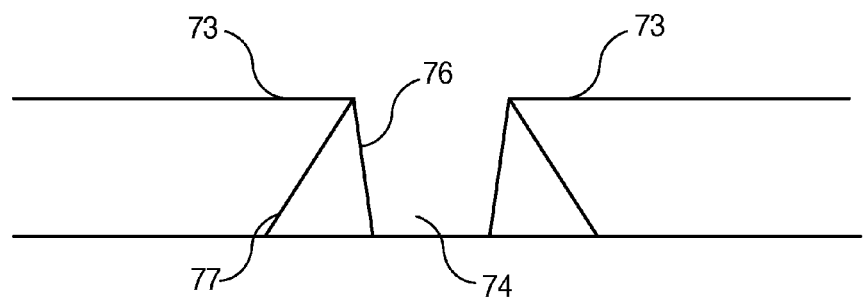
FIG. 8 represents a side view of the sharp part of the cutting tool.

According to FIG. 8, the sharp segments 75 defining the breaks 74 have a very steep slope 76 on the side of the breaks 74 and gentler slope 77 on the opposite side. The slope 76 ensures that the linking bridge is held properly during the cutting, thereby guaranteeing a repeatability in the width of bridges. The slope 77 provides the sturdiness of the sharp segment 75 for a longer lifespan.

The tickets according to the invention are ready to be inserted into a dispensing machine and guarantee a separation force between two tickets within a limited tolerance range. During the separation, the hinges break at their weak spot which is linked to the internal fibers of layers forming the tickets. As the hinges have a certain length, the break leaves on one of the tickets some length of hinges that can vary from one ticket to another.

Figure 9:
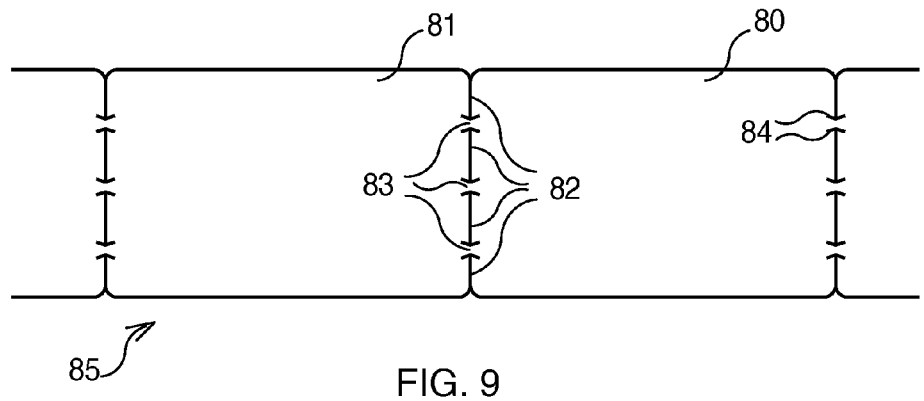
FIG. 9 represents a top view of a set of tickets according to a variant of the invention.

A variant of the invention described below guarantees an equal break, i.e. at the same location on all tickets. According to FIG. 9, the multilayer tickets in the form of rolls or fanfold strip are attached to one another by their cross edge to form a strip 85 of detachable tickets. Each ticket 80 has, at its end common with the next ticket 81, cross precuts 82 and longitudinal precuts 84 located at the ends of the cross precuts. The cross precuts 82 are perpendicular to the strip of tickets 85 while the longitudinal precuts 84 are oblique to the cross precuts 82. The precuts are separated by linking bridges 83, the centre of bridges 83 and the cross precuts 82 being aligned along a line dividing two adjacent tickets along which the rupture by tension will occur. The V-shaped longitudinal precuts 84 extend the linking bridges 83 towards the inside of the ticket 80. The precuts 84 form, two by two and on either side of the line formed by the precuts 82, two trapezoids joined by their smaller base. The linking bridges are thus clearly defined by two V-shaped precuts 84 and play the role of a hinge during the folding of the strip of tickets in a fanfold manner, as can be seen in detail in FIG. 4. The width of this base located at their centre becomes superposed to the line along which the precuts 82 are located. The linking bridges thus formed fit exactly into a rectangle whose edges parallel to the line dividing the two tickets have a length between 1.1 mm and 2 mm and the two other edges have a length between 0.9 mm and 2.5 mm.

Figure 10:
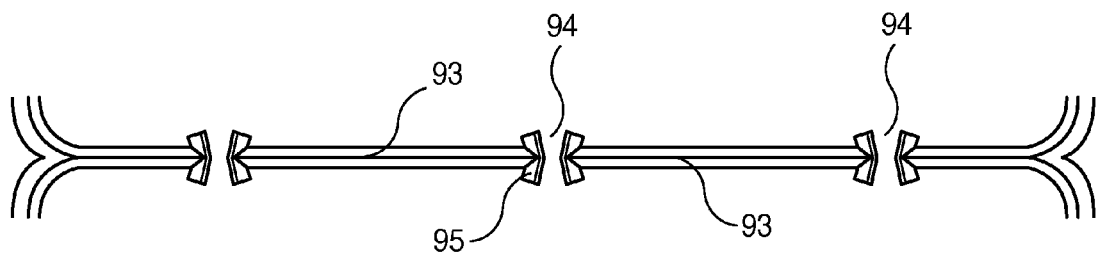
FIG. 10 represents a top view of the sharp part of the cutting tool used with the set of tickets shown in FIG. 9.

The ticket finishing machine is the same as the one described for tickets according to the first embodiment of the invention described earlier and particularly with reference to FIGS. 5 and 6. To manufacture the tickets according to the variant of the invention, the difference lies in the shape of blades. As such, according to FIG. 10, the breaks 74 in the cross blades 93 are completed by sharp segments 95 that are used to make longitudinal precuts of small length in the tickets.

Figure 11:
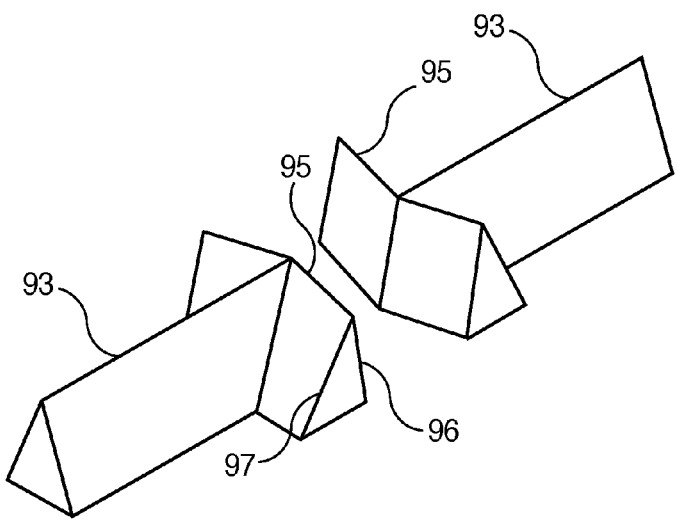
FIG. 11 represents a perspective view of the sharp part of the cutting tool of the finishing machine shown in the previous figure.

According to FIG. 11, the sharp segments 95 defining the breaks 94 have a very steep slope 96 on the side of the breaks 94 and a gentler slope 97 on the opposite side. The slope 96 ensures that the linking bridge is held properly during the cutting, thereby guaranteeing a repeatability in the width of bridges. The slope 97 provides the sturdiness of the sharp segment 95 for a longer lifespan. At the closest location, the sharp segments 95 are separated by a distance between 1.1 mm and 2 mm.

Figure 1:
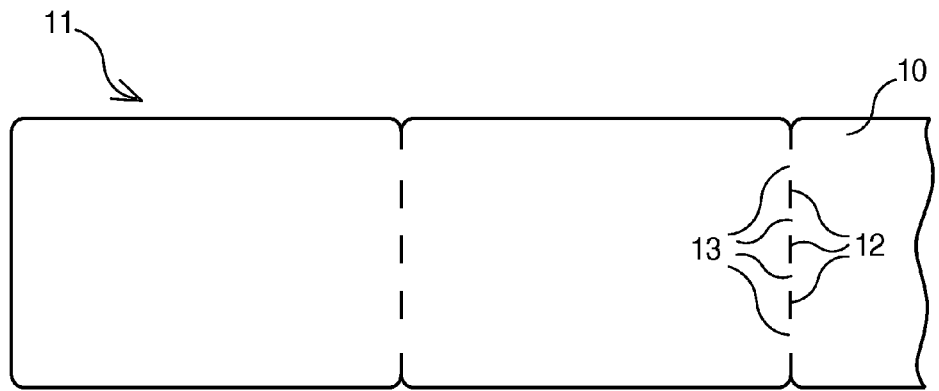
FIG. 1 represents a strip of tickets according to prior art.
Figure 2:
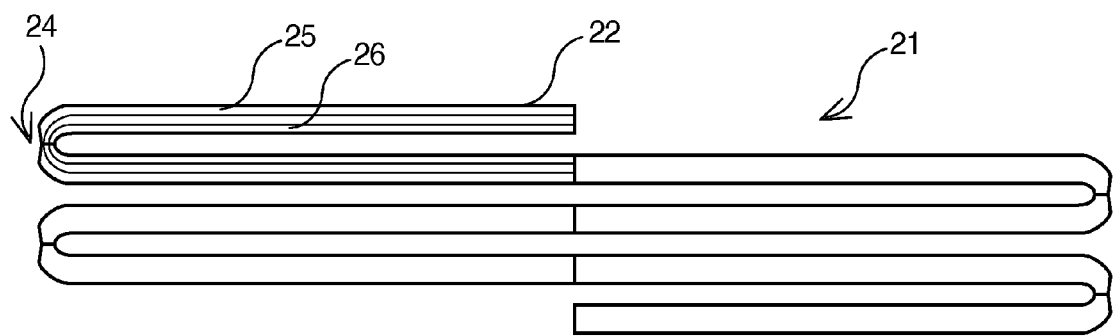
FIG. 2 represents the tickets stored in the form of a fanfold strip.

In comparison with the precuts made in the prior art illustrated in FIG. 1, the invention presents an advantage that is revealed from the manufacturing step. When the precuts 12 between the tickets are only cross precuts as shown in FIG. 1, the bridges 13 of tickets are subjected to stretching when the precuts are made, which leads to stresses in the fibers of the ticket located in the extension of precuts 12, that is to say along the line dividing the tickets. As the cutting blades have a triangular section, when the blade passes through the thickness of the ticket and reaches the steel strip, the larger side of the blade is on the side where the blade has started cutting the ticket. As a result, the layer located on this side is subjected to more stretching than the one located against the steel strip. According to the invention, the longitudinal precuts 34 and 84 are used to transmit the stretching forces undergone normally on the line dividing the bridges at the end of bridges. In this manner, the stresses are distributed over the width of bridges and on either side of the line separating the tickets on arcs so that the fibers of all layers of tickets situated along the dividing line are preserved.

The invention claimed is:

1. A set of tickets in the form of a continuous strip of multilayer detachable tickets comprising, between two adjacent tickets, cross precuts that are perpendicular to the strip, alternating with ticket linking bridges, the cross precuts being used to guide the separation of adjacent tickets when a pulling force is applied on one of the tickets, wherein each of said cross precuts include at both their ends longitudinal precuts that are perpendicular or oblique to the cross precuts so that said linking bridges between two adjacent tickets act as hinges when said adjacent tickets are folded or are not in the same plane, thus preventing an outer layer of said multilayer detachable ticket from being subjected to more stresses than an inner layer, and wherein said continuous strip of multilayer detachable tickets is in the form of a fanfold strip.

2. The set of tickets of claim 1, wherein said linking bridges are defined by two longitudinal precuts that are perpendicular to each other and have a rectangular shape.

3. The set of tickets of claim 1, wherein said linking bridges have a length between 0.9 mm and 2.5 mm and are separated by a distance between 1.1 mm and 2 mm.

4. The set of tickets of claim 1, wherein said linking bridges defined by two V-shaped longitudinal precuts have a shape corresponding to two trapezoids linked by their smaller base which is superposed to the line along which the precuts are located so that the tickets always detach at the same location.

5. A device enabling the manufacture of the set of tickets of claim 1, said device comprising cross blades aligned with each other and designed to make cross precuts in said tickets, said cross blades defining breaks being used to form linking bridges in the tickets, said cross blades including segments adapted to make longitudinal precuts in the tickets.

6. The device of claim 5, wherein the sharp segments defining the breaks have a very steep slope on the side of the breaks and a very gentle slope on the opposite side.

7. The device of claim 5, wherein the sharp segments located at the ends of cross blades are parallel to each other.

8. The device of claim 5, wherein the sharp segments located at the ends of cross blades are V-shaped.

9. The strip of tickets of claim 1, wherein the longitudinal precuts extend on both sides of the cross precuts.

* * * * *